United States Patent [19]
Mayer

[11] 3,956,705
[45] May 11, 1976

[54] PULSE RATE COMPARISON CIRCUIT
[75] Inventor: Robert Mayer, Ardmore, Pa.
[73] Assignee: Sun Oil Company of Pennsylvania, Philadelphia, Pa.
[22] Filed: Mar. 15, 1974
[21] Appl. No.: 451,720

[52] U.S. Cl. ................................. 328/133; 328/44; 328/45; 307/233 R; 307/247 R
[51] Int. Cl.² ...................... H03D 13/00; H03K 5/20
[58] Field of Search ............... 328/134, 44, 48, 141; 307/233, 222

[56] References Cited
UNITED STATES PATENTS

| | | | |
|---|---|---|---|
| 3,735,218 | 5/1973 | Kuhert | 328/134 |
| 3,763,380 | 10/1973 | Homer et al. | 307/233 R |
| 3,781,695 | 12/1973 | Jackson | 328/44 X |

*Primary Examiner*—Robert Segal
*Attorney, Agent, or Firm*—J. Edward Hess; Donald R. Johnson; William C. Roch

[57] ABSTRACT

Pulses produced by a stream flowmeter, at a repetition rate proportional to the actual flowrate of a liquid, are compared in a counter arrangement with pulses whose repetition rate is the demand flowrate for this liquid. The circuit produces an alarm whenever the difference between the actual flowrate and the demand flowrate is greater than 6%, or 10%. The alarm is inhibited until after 45 seconds subsequent to startup of the blending system for which the said liquid serves as one component.

18 Claims, 3 Drawing Figures

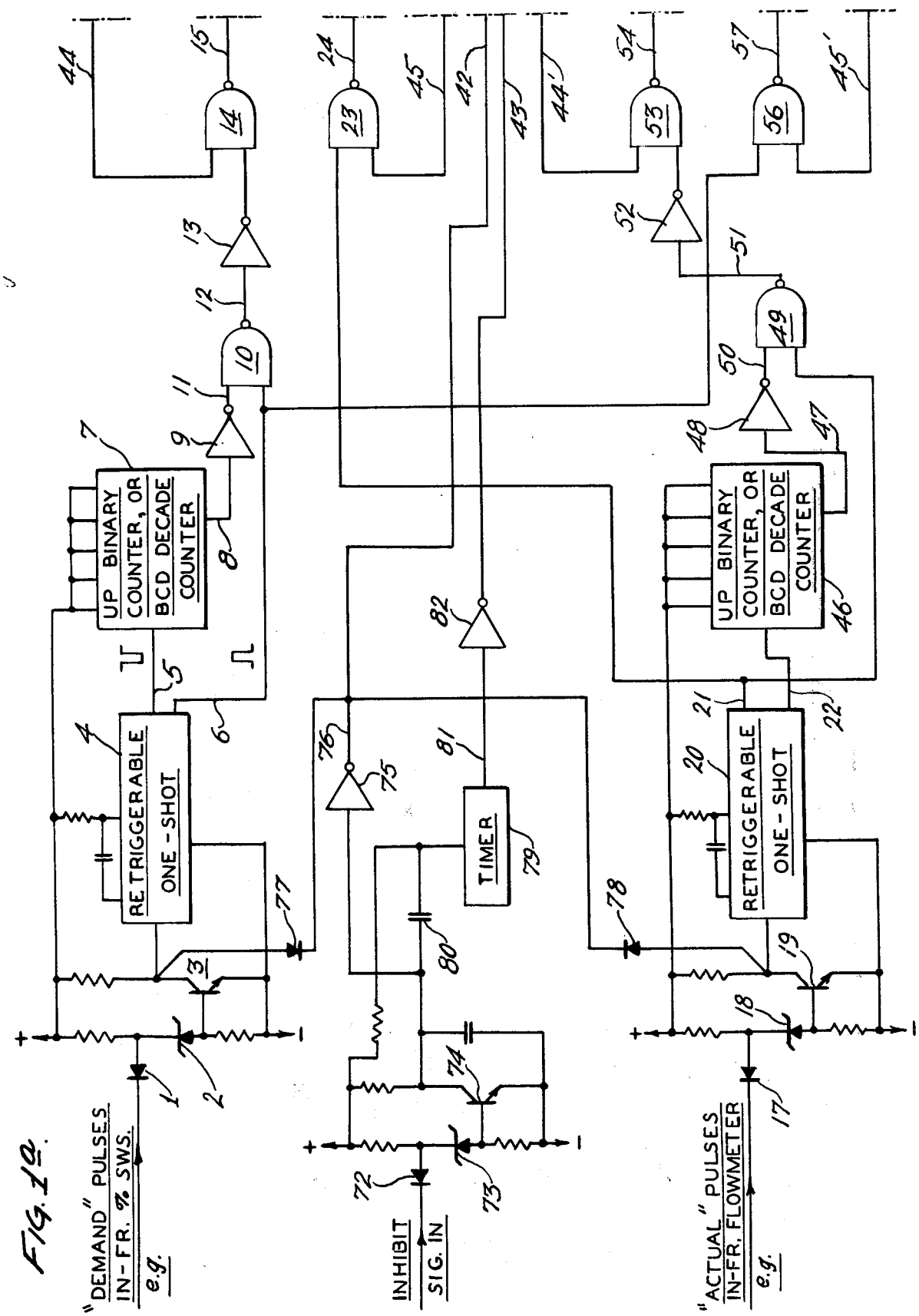

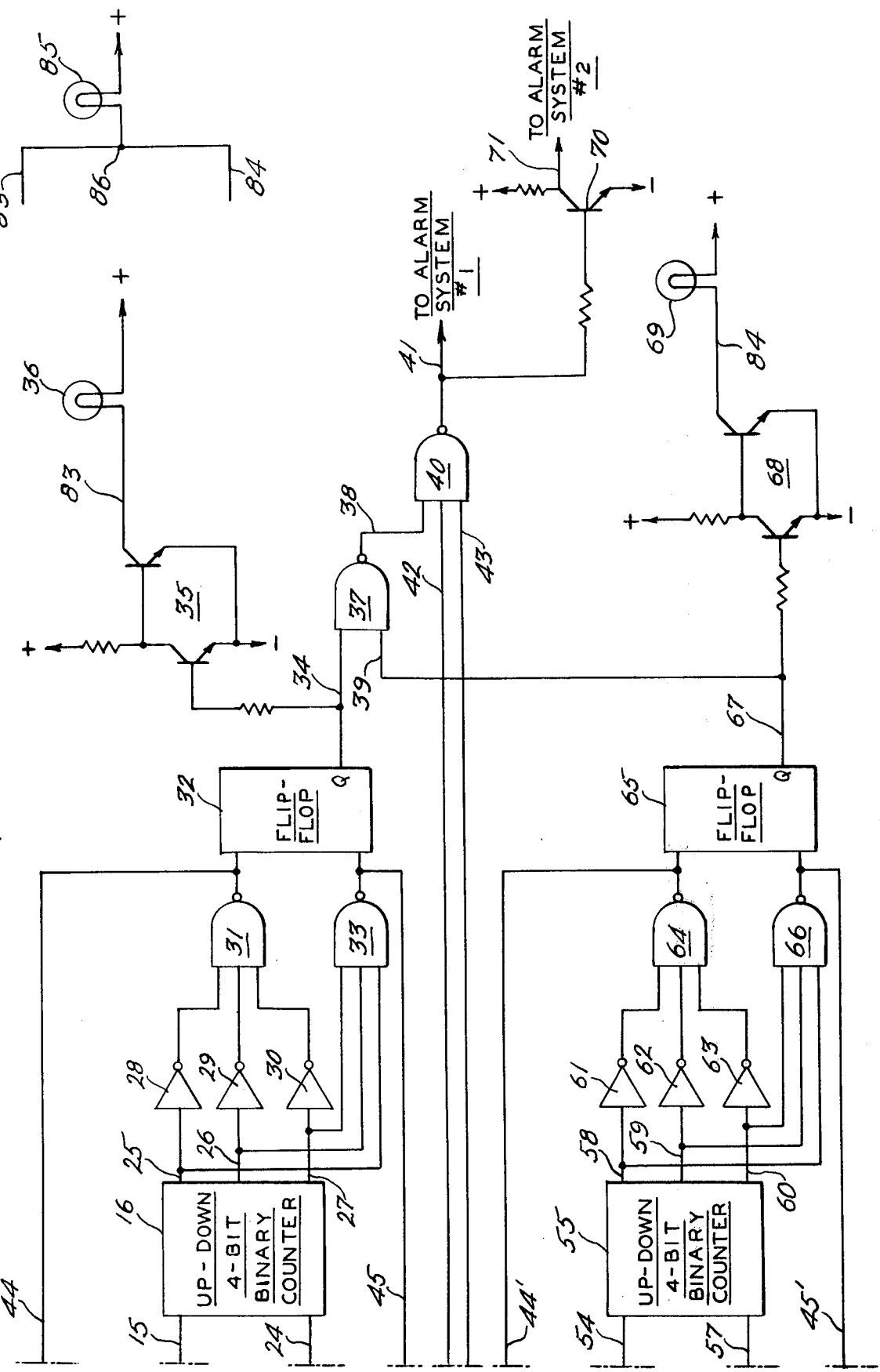

PULSE RATE COMPARISON CIRCUIT

This invention relates to a pulse rate comparison circuit which finds particular utility in a blending system of the type disclosed in my copending application Ser. No. 422,801, filed Dec. 7, 1973 now U.S. Pat. No. 3,860,030, issued Jan. 14, 1975. In a system of this type, a pulse generator, operating at an adjustable repetition rate proportional to the volumetric flow of a blend (such as 50 pulses per gallon, for example), supplies pulses to a plurality of groups of manually settable switches each of which selects a number of pulses corresponding to the switch setting. Each group of switches corresponds to a particular liquid, and therefore the output from each such group of switches constitutes the demand flowrate pulses for that particular liquid. A separate flowmeter (which may be termed a stream flowmeter) associated with each respective liquid produces pulses at a repetition rate proportional to the actual flowrate of the respective liquid, and these latter pulses constitute the actual flowrate pulses for that respective or particular liquid.

Faulty or improper operation of the described blending system may occur, an it is highly desirable that the operator be alerted to such operation. Such faulty operation may cause the actual flowrate of a liquid to differ considerably from the demand flowrate of the liquid.

Therefore, an object of this invention is to provide a novel circuit for comparing the repetition rates of two sets of pulses, and for producing an indication of differences therebetween.

Another object is to provide, for use in a digitally controlled blending system, a circuit for comparing the repetition rates of the actual flowrate pulses and the demand flowrate pulses.

A further object is to provide a novel circuit for comparing the repetition rates of two sets of pulses, and for producing an alarm whenever these rates differ or deviate from each other by more than a preset or preestablished percentage.

A still further object is to provide, for use in a digitally-controlled blending system, a circuit for comparing the repetition rates of the actual flowrate pulses and the demand flowrate pulses, and for producing an indication of differences therebetween.

Yet another object is to provide, for use in a digitally controlled blending system, a circuit for comparing the repetition rates of the actual flowrate pulses and the demand flowrate pulses, and for producing an alarm whenever these rates differ or deviate from each other by more than a preset or preestablished percentage.

A detailed description of the invention follows, taken in conjunction with the accompanying drawings, wherein:

FIGS. 1a and 1b, taken together, comprise a circuit diagram for an embodiment of the present invention; and FIG. 2 is a partial circuit diagram, illustrating a modification.

Referring now to the drawing, one train of pulses (which is to be compared with another train of pulses by means of the circuit of this invention) is fed through a diode 1 and then over a Zener diode 2 to the base of a transistor 3, and from the collector of this transistor to the input of a retriggerable one-shot 4 in the form of an integrated circuit (IC). By way of example, the train of pulses referred to may be the "demand flowrate" pulses of the blending system disclosed in my aforementioned application, which are derived from the output side of a group of manually operable percent switches supplied from a pulse generator operating at some preset frequency.

The IC 4 functions to sharpen (i.e., shorten) the pulses fed to the input thereof, such that the pulses appearing on the output leads 5 and 6 of this IC are very narrow (10 microseconds wide, for example); the pulses appear simultaneously on the two output leads 5 and 6 but in inverted relation to each other, as indicated by the waveforms adjacent these respective leads.

Output lead 5 is connected to the "clock pulse" input of an IC 7, which may be either an up binary counter, or a BCD decade counter. The circuit of this invention is arranged to produce an alarm whenever the "actual flowrate" (represented by one train of pulses) is more than 6%, or 10%, away from the demand flowrate (represented by another train of pulses). Typically, for a 6% arrangement, an up binary counter would be utilized for the IC 7, while for a 10% arrangement, a BCD decade counter would be used at 7. The 6% arrangement will be specifically described hereinafter.

The four-bit binary counter 7 is set up to count 15 out of the 16 bits which are present in a complete cycle. Output is taken at 8 from the counter 7, is passed through an inverter 9, and is applied at 11 as one of the two inputs to a NAND gate 10, the arrangement being such that there is normally a 1 or "high" signal at the inverter output 11.

The output lead 6 from the one-shot device 4 supplies the other input to the gate 10, this other input being a series of 1 or high pulses. Since the counter 7 counts only 15 out of the 16 bits present in a complete cycle, it down"effect inhibits one pulse out of 16, so that the inverter output 11 is 15 out of 16 pulses. Hence, every 16th pulse is prevented from passing through the gate 10, resulting in an output at 12 from this gate of 94% of the demand signal (pulse train) which is fed as primary input to the circuit, through the diode 1.

The output 12 of gate 10 is fed through an inverter 13 to a NAND gate 14, and through this latter gate (which may be considered as being normally "open," to pass the signal at the output of inverter 13 to the gate output 15) to the "count down" terminal of an IC 16 which is an up-down four-bit binary counter. Thus, the counter 16 is clocked downward by 94% of the demand signal fed into the circuit at diode 1.

The other train of pulses (which is to be compared with the train previously mentioned) is fed through a diode 17 and then over a Zener diode 18 to the base of a transistor 19, and from the collector of this transistor to the input of a retriggerable one-shot 20 in the form of an IC. By way of example, the train of pulses last mentioned may be the actual flowrate pulses of the blending system disclosed in my aforementioned application, which are produced by a stream flowmeter at a repetition rate proportional to the actual flowrate of a liquid.

The IC 20, like the IC 4, functions to sharpen the pulses fed to the input thereof, such that the pulses appearing on the output leads 21 and 22 of this IC are very narrow; the pulses appear simultaneously on the two output leads 21 and 22 but in inverted relation to each other.

Output lead 21 is connected to one input of a NAND gate 23, and through this latter gate (which may be considered as being normally open, to pass the signal on lead 21 to the gate output 24) to the "count up" terminal of the counter 16. Thus, the counter 16 is clocked upward by the actual flowrate signal fed into the circuit at diode 17.

Output is taken from counter 16 by means of three output leads 25, 26, and 27, and is fed through separate respective inverters 28, 29, and 30 to provide the three inputs to a NAND gate 31 the output of which is connected to the "clear direct" input connection of a flip-flop 32. The output leads 25–27 are also coupled directly to the three inputs of another NAND gate 33 the output of which latter is connected to the "set direct" input connection of flip-flop 32.

If the repetition rate of the "actual" pulses reaching gate 23 (and clocking counter 16 upward) is less than 94% of the rate of the demand pulses fed into the circuit at diode 1 (it will be remembered that pulses in this train clock the counter 16 downward), the counter 16 goes to the low end or down end (which may be thought of as the alarm end) and sets the flip-flop 32. The arrangement of the flip-flop 32 is such that under so-called "normal" conditions there is a 1 or high at the output 34 of this flip-flop, but under the "alarm" conditions just described there is a 0 or "low" at this output. The 0 signal on flip-flop output lead 34, amplified in a two-stage transistor power amplifier 35, causes energization of an alarm indicator (light) 36 which may signify "flowmeter low", it being remembered that the actual pulses fed in at diode 17 may be derived from a flowmeter. Light 36 is connected by means of lead 83 to the collector electrode in the second stage of amplifier 35.

The 0 alarm signal produced at 34 is coupled to NAND gate 37 as one input therefor, and results in a 1 or high being produced at the gate output 38, since the other input 39 to this gate is normally a 1 or high (as will be further described hereinafter).

The signal on output lead 38 is fed as one of the three inputs to a NAND gate 40; when the signal on 38 goes to a 1 under alarm conditions, a 0 signal is produced at the output 41 of gate 40, since the other two inputs 42 and 43 for this gate are both normally 1 or high (as will later be detailed). The 0 when alarm signal on 41 is sent to an alarm system (not shown), to energize the alarm.

To the output of gate 31 a lead 44 is connected, the other end of this lead extending back to gate 14, to provide one of the inputs for the latter (it being remembered that the other input to gate 14 comprises 94% of the demand signal). Normally, the signal on lead 44 is a 1 or high, so that gate 14 is then open to pass the signal at the output of inverter 13 on to the gate output 15. However, when the count in counter 16 reaches one or zero, a 0 is developed on lead 44, which cuts off or closes the gate 14 under these conditions, thus preventing any more of the demand pulses from getting through to clock the counter 16 further downward.

Similarly, a lead 45 is connected to the output of gate 33, the other end of this lead extending back to gate 23, to provide one of the inputs for the latter (it being remembered that the other input to gate 23 comprises the flowmeter or actual flowrate signal). Normally, the signal on lead 45 is a 1 or high, so that gate 23 is then open to pass the signal on output lead 21 on to the gate output 24. However, when the count in counter 16 reaches 14 or 15, a 0 is developed on lead 45, which cuts off or closes the gate 23 under these conditions, thus preventing any more of the actual pulses from getting through to clock the counter 16 further upward.

Output lead 22 (of the IC 20) is connected to the clock pulse input of an IC 46, which is exactly similar to the IC 7 previously described (for a 6% arrangement, this would be an up binary counter).

The four-bit binary counter 46 is set up to count 15 out of the 16 bits which are present in a complete cycle. Output is taken at 47 from the counter 46, is passed through an inverter 48, and is applied at 50 as one of the two inputs to a NAND gate 49, the arrangment being such that there is normally a 1 or high signal at the inverter output 50.

The output lead 21 from the one-shot device 20 supplies the other input to the gate 49, this other input being a series of 1 or high pulses. Since the counter 46 counts only 15 out of the 16 bits present in a complete cycle, the inverter output 50 is, in effect, 15 out of 16 pulses. Hence, every 16th pulse is prevented from passing through the gate 49, resulting in an output at 51 from this gate of 94% of the actual signal (pulse train) which is fed as primary input to the circuit, through the diode 17.

The output 51 of gate 49 is fed through an inverter 52 to a NAND gate 53, and through this latter gate (which may be considered as being normally open, to pass the signal at the output of inverter 52 to the gate output 54) to the count down terminal of an IC 55 which, like IC 16, is an up-down four-bit binary counter. Thus, the counter 55 is driven by 94% of the actual or flowmeter signal (which is fed into the circuit at diode 17) counting downward.

Output lead 6 of the one-shot 4 is connected to one input of NAND gate 56, and through this latter gate (which may be considered as being normally open, to pass the signal on lead 6 to the gate output 57) to the count up terminal of the counter 55. Thus, the counter 55 is also driven by the demand signal (which is fed into the circuit at diode 1) counting upward.

Output is taken from counter 55 by means of three output leads 58, 59, and 60, and is fed through separate respective inverters 61, 62, and 63 to provide the three inputs to a NAND gate 64 the output of which is connected to the clear direct input connection of a flip-flop 65. The output leads 58–60 are also coupled directly to the three inputs of another NAND gate 66 the output of which latter is connected to the set direct input connection of flip-flop 65.

If the repetition rate of the actual or flowmeter pulses fed into the circuit at diode 17 (it will be remembered that pulses in this train clock the counter 55 downward) is greater than 106% of the rate of the demand pulses reaching gate 56 (and clocking counter 55 upward), the counter 55 counts to the low end or down end (which may be thought of as the alarm end) and sets the flip-flop 65. The arrangement of the flip-flop 65 is such that under so-called normal conditions there is a 1 or high at the output 67 of this flip-flop, but under the alarm conditions just described there is a 0 or low at this output.

The 0 signal on flip-flop output lead 67, amplified in a two-stage transistor power amplifier 68, causes energization of an alarm indicator (light) 69 which may signify flowmeter high, it being remembered that the actual pulses fed in at diode 17 may be derived from a flowmeter. Thus, if either of the alarms described hereinabove occur, the circuit of the invention will energize the light 36, or the light 69; these latter may be thought of as together comprising a local indicator, for indicating which stream has caused the alarm to occur. Light 69 is connected by means of lead 84 to the collector electrode in the second stage of amplifier 68.

Alternately, a modified alarm light (alarm lamp) circuit may be used. This is illustrated in FIG. 2. The leads 83 and 84, from the transistor amplifiers 35 and 68 respectively, may be connected together at point 86, and from this latter point a lead extends through a signal light 85 to a positive potential supply terminal. Thus, in the modification of FIG. 2, the lamps 36 and 69 are omitted, being replaced by the single lamp 85.

For a given application of the circuit of this invention, either the two lamps 36 and 69 would be used, or the single lamp 85. In the latter case, obviously, the operator would not know if the alarm were due to a high or a low condition, but he would know which module caused the alarm (there being in this latter case one light such as 85 for each module).

The 0 alarm signal produced at 67 is coupled to the input 39 of NAND gate 37. It is clearly impossible, in practice, for alarm signals to be produced simultaneously at the outputs of both of the flip-flops 32 and 65; hence; when there is a 0 alarm signal on one of the outputs (e.g., on 67, 39), there is a normal 1 signal on the other output (e.g., on 34). Thus, the 0 alarm signal assumed to be produced at 67 results in a 1 or high being produced at the gate output 38, as before. This results in a 0 signal at the output 41, which is sent to the alarm system previously mentioned, to energize the alarm.

The 0 when alarm signal on 41 may be passed through an amplifier-inverter transistor 70 to provide on the transistor output lead 71 a 1 when alarm signal, which may be sent to the alarm system to operate the same in response to this latter type of alarm signal.

A lead 44' is connected from the output of gate 64 back to one input of gate 53 (it being recalled that the other input to gate 53 comprises 94% of the actual or flowmeter signal). This lead 44' provides an action exactly analogous to that provided by lead 44 (previously described); the signal developed on lead 44' cuts off or closes gate 53 when the count in counter 55 reaches 1 or 0.

A lead 45' is connected from the output of gate 66 back to one input of gate 56 (it being recalled that the other input to gate 56 comprises the demand signal). This lead 45' provides an action exactly analogous to that provided by lead 45 (previously described); the signal developed on lead 45' cuts off or closes gate 56 when the count in counter 55 reaches 14 or 15.

Summarizing the operation so far described, the circuit of this invention compares the pulse repetition rates of two trains of pulses and provides an alarm signal when the actual or flowmeter rate is less than 94% of the demand rate (this alarm signal being provided by counter 16, acting on flip-flop 32, indicated by lamp 36), or when the actual or flowmeter rate is greater than 106% of the demand rate (this latter alarm signal being provided by counter 55, acting on flip-flop 65, indicated by lamp 69). Thus, if the circuit of the invention is utilized in a blending system, an alarm is produced whenever the actual flowrate of the blender is greater than 6% away from the flowrate demanded by the blender.

If it is desired that the circuit alarm at ± 10%, rather than at ± 6%, the IC units 7 and 46 would be replaced by BCD decade counters, connected so that one pulse out of ten would be inhibited; in this case, the outputs at 8 and 47, respectively, would be nine out of 10 pulses. In this case, the signal going into gate 14 would be 90% of the demand pulses, and the signal going into gate 53 would be 90% of the actual or flowmeter pulses. Thus, under these conditions the circuit would provide an alarm signal when the actual or flowmeter rate is less than 90%, or greater than 110%, of the demand rate; the alarm would then be set for ± 10% away from the demand point.

Although by means of changing the two IC units 7 and 46 the circuit can be made to alarm at ± 6% or at ± 10%, the concept can be used for any percentage, depending upon what division circuitry is used.

Inasmuch as the actual flowrate and the demand flowrate, in a blender, are not close to the same valve during startup, the circuit of this invention also includes means for inhibiting of the alarm both during the startup preliminaries and also during a time interval of 45 seconds subsequent to actual startup. These inhibiting arrangements will now be described.

Assuming the pulse rate comparison circuit of the present invention is being used in a blender (blending system) such as that of my aforementioned application, an inhibit signal (which is negative) is applied to the circuit of the invention during the startup preliminaries, and is released or removed from such circuit at the time of actual startup (i.e., when the blending actually begins). This is done by means of switches not specifically disclosed herein.

The inhibit signal is fed through a diode 72 and then over a Zener diode 73 to the base of a transistor 74, and from the collector of this transistor to a signal inverter 75 having an output connection 76. As long as an inhibit signal is applied to diode 72, there is a 0 signal at output 76. This 0 signal is applied through a diode 77 to the collector of transistor 3, and hence to the input connection of the one-shot IC 4; this 0 signal disables (i.e., inhibits or cuts off) the one-shot device 4, and hence prevents the production of any pulses on its output leads 5 and 6.

When the inhibit signal is removed from the diode 72, a 1 signal appears at output 76, which allows the device 4 to operate normally, that is, to produce pulses on its leads 5 and 6 in response to the demand pulses fed in by way of diode 1.

The 0 signal (for inhibit) at output 76 is also applied through a diode 78 to the collector of transistor 19, and hence to the input connection of the one-shot IC 20; this 0 signal inhibits the device 20 and hence prevents the production of any pulses on its output leads 21 and 22.

When the inhibit signal is removed from diode 72, the 1 signal then appearing at output 76 allows the device 20 to operate normally, that is, to produce pulses on its leads 21 and 22 in response to the actual pulses fed in by way of diode 17.

The inverter output 76 is also coupled to input 42 of the NAND gate 40. The 0 during inhibit signal developed on output 76 (and applied to input 42) keeps gate 40 cut off during the application of the inhibit signal at 72, and thus prevents any alarm signal (which might appear at 38 during this time, in the form of a 1 or high) from getting through to the gate output 41.

Thus, the alarm inhibit arrangement previously described inhibits the system during the entire time that an inhibit signal is impressed on the circuit 72.

A timer 79, which is a long duration one-shot multivibrator, has its input coupled to the collector of transistor 74 through a capacitor 80. When the negative inhibit signal is removed from diode 72, a negative pulse appears at the collector of transistor 74, which starts the timer 79. When this timer is thus started, a 1 or high appears at the timer output 81, which is maintained during the time interval (say 45 seconds) measured by the timer.

The 1 signal at 81 is applied to a signal inverter 82 having an output connection 43 (which is the same as the input 43 for NAND gate 40), and appears as a 0 or low at 43. Thus, there is a 0 signal applied to gate input 43 during 45 seconds (the time interval measured by timer 79) after the inhibit signal is released or removed from diode 72. The 0 delayed inhibit signal developed at 43 keeps gate 40 cut off or inhibited for 45 seconds after the inhibit signal has been removed from the circuit.

At the end of this 45 seconds after the inhibit is released, a 0 or low appears at 81, resulting in a 1 or high at gate input 43. In this connection, it is pointed out that a 1 or high appears on output 76 (and on the gate input 42) when the inhibit signal is released. During normal operation (at the end of 45 seconds after the inhibit signal is released), ones or highs are applied to both gate inputs 42 and 43, so that when a 1 or high appears at 38 in response to an alarm condition, a 0 or low appears at 41, operating the alarm.

Summarizing the actions of both portions of the alarm inhibit arrangement previously described, the alarm circuit of this invention is inhibited for the entire time that an inhibit signal is applied, as well as for an additional 45 seconds (after the inhibit signal has been removed from the circuit).

The invention claimed is:

1. A circuit for comparing the repetition rates of two trains of pulses and for producing an alarm in response to a difference in such rates in excess of a preset value, comprising a bidirectional counter, means for feeding the pulses in one of said trains to said counter to cause the same to count in one direction, means for feeding a preset percentage less than 100% of the pulses in said other train to said counter to cause the same to count in the other direction, and means coupled to said counter for producing an alarm signal upon the count reaching a predetermined count within said counter.

2. Circuit according to claim 1, wherein the pulses in said one train cause the counter to count upwardly, wherein the pulses in said other train which reach the counter cause the same to count downwardly, and wherein said alarm signal is produced upon the count reaching a predetermined low count within the counter.

3. Circuit defined in claim 1, wherein the pulses in said one train are representative of the actual flow of a liquid, the pulse repetition rate being proportional to the actual flowrate of the liquid; and wherein the pulses in said other train are representative of the flow demand of the liquid, the pulse repetition rate being proportional to the demand flowrate of the liquid.

4. Circuit according to claim 3, wherein the actual flowrate pulses causes the counter to count upwardly, wherein the demand flowrate pulses which reach the counter cause the same to count downwardly, and wherein said alarm signal is produced upon the count reaching a predetermined low count within the counter.

5. Circuit defined in claim 1, wherein the pulses in said one train are representative of the flow demand of a liquid, the pulse repetition rate being proportional to the demand flowrate of the liquid; and wherein the pulses in said other train are representative of the actual flow of the liquid, the pulse repetition rate being proportional to the actual flowrate of the liquid.

6. Circuit according to claim 5, wherein the demand flowrate pulses cause the counter to count upwardly, wherein the actual flowrate pulses which reach the counter cause the same to count downwardly, and wherein said alarm signal is produced upon the count reaching a predetermined low count within the counter.

7. Circuit of claim 1, including also a second bidirectional counter, means for feeding the pulses in said other of said trains to said second counter to cause the same to count in one direction, means for feeding a preset percentage less than 100% of the pulses in said one of said trains to said second counter to cause the same to count in the other direction, and means associated with said second counter for producing a second alarm signal upon the count reaching a predetermined count within said second counter.

8. Circuit according to claim 7, wherein the pulses in said other train cause the second counter to count upwardly, wherein the pulses in said one train which reach the second counter cause the same to count downwardly, and wherein said second alarm signal is produced upon the count reaching a predetermined low count within said second counter.

9. Circuit defined in claim 7, wherein the pulses in said one train are representative of the actual flow of a liquid, the pulse repetition rate being proportional to the actual flowrate of the liquid; wherein the pulses in said other train are representative of the flow demand of the liquid, the pulse repetition rate being proportional to the demand flowrate of the liquid.

10. Circuit according to claim 9, wherein the actual flowrate pulses cause the first-mentioned counter to count upwardly, wherein the demand flowrate pulses which reach the first-mentioned counter cause the same to count downwardly, wherein the first-mentioned alarm signal is produced upon the count reaching a predetermined low count within the first-mentioned counter, wherein the demand flowrate pulses cause said second counter to count upwardly, wherein the actual flowrate pulses which reach said second counter cause the same to count downwardly, and wherein said second alarm signal is produced upon the count reaching a predetermined low count within said second counter.

11. Circuit of claim 1, including also means for supplying an inhibit signal to the first-mentioned feeding means, thereby to inhibit the feeding of pulses in said one train to said counter.

12. Circuit according to claim 11, wherein said inhibit signal supplying means also supplies an inhibit signal to the alarm signal producing means.

13. Circuit of claim 1, including also means for supplying an inhibit signal to the second-mentioned feeding means, thereby to inhibit the feeding of pulses in said other train to said counter.

14. Circuit of claim 1, including also means for supplying an inhibit signal to the first-mentioned feeding means and also to the second-mentioned feeding means, thereby to inhibit the feeding of pulses in said one train and in said other train to said counter.

15. Circuit according to claim 14, wherein said inhibit signal supplying means also supplies an inhibit signal to the alarm signal producing means.

16. Circuit of claim 1, including also controllable means for supplying an inhibit signal to the first-mentioned feeding means, and timing means for supplying an inhibit signal to the alarm signal producing means during a predetermined time interval following the release of the inhibit signal from the first-mentioned feeding means.

17. Circuit according to claim 16, wherein said inhibit signal supplying means also supplies an inhibit signal to the alarm signal producing means prior to the release of the inhibit signal from the first-mentioned feeding means.

18. Circuit in accordance with claim 16, including also controllable means for supplying an inhibit signal to the second-mentioned feeding means, the inhibit signal supplied to the second-mentioned feeding means being released therefrom simultaneously with the release of the inhibit signal from the first-mentioned feeding means.

* * * * *